Dec. 27, 1938.   S. B. VON THYSSEN-BORNEMISZA   2,141,628

GRAVITY MEASURING INSTRUMENT

Filed Sept. 6, 1934

*Inventor:*
Stephan Baron von Thyssen-Bornemisza

By O. A. Munk
his ATTY.

Patented Dec. 27, 1938

2,141,628

UNITED STATES PATENT OFFICE 2,141,628

GRAVITY MEASURING INSTRUMENT

Stephan Baron von Thyssen-Bornemisza, The Hague, Netherlands, assignor to Shell Development Company, San Francisco, Calif., a corporation of Delaware Application September 6, 1934, Serial No. 742,878
In Germany January 17, 1934

8 Claims. (Cl. 265—1.4)

The accurate determination of variation of the gravitational acceleration is of great importance for the exploration of the earth, particularly for determining the position of deposits. Hitherto for this purpose mostly the Sterneck pendulum has been utilized. Measurements effected with this instrument have, however, the defect that they are lengthy and complicated.

This invention has for its object an instrument for the determination of the variations of gravitational acceleration which has the advantage over the known devices that it delivers very accurate results, it operates quickly and is simple to handle and construct. Moreover, the instrument is shock proof and easy to transport and for this reason it is particularly suitable for the use of what may be termed measuring gangs in open country.

The instrument comprises a mass connected to a lever system, variations in the position of which due to variations in the gravitational acceleration cause variations in a lever arm, the sense of the variation of the lever arm being such that the oscillation of the mass movement is amplified. To the lever system in which the mass is located a spring is attached which tends to oppose change of position. If for example the gravitational acceleration is increased and thereby the lever system is oscillated, then the lever arm on which the mass is disposed is prolonged, or the lever arm upon which the spring acts is shortened. Consequently, the mass has to move further in the direction of the original oscillation. Obviously the reverse would occur if the gravitational acceleration decreased. The arrangement may be such that with the variation of the gravitational acceleration and the variation in the position of the mass caused thereby, the effective length of the lever arm supporting the mass, is varied. An auxiliary mass may also be employed and this may be so disposed that its lever arm varies when the mass moves.

If the measurements are correctly selected it is possible to provide an instrument according to the invention which has a maximum sensitiveness and therefore becomes particularly suitable for the exploration of deposits.

The invention may be carried into effect in a variety of ways. For example, a mass may be secured to or suspended from one end of a rod, the other end of which terminates in a blade spring in such manner that this holds the rod in inclined position. If now the gravitational acceleration is increased, the inclination of the rod and consequently the lever arm of the mass is increased. The system comes to rest only when the blade spring is able to balance out the effect of gravitational acceleration and the increase of the lever arm as a result of the accentuation of its curvature. The value of gravitational force can thus be measured by the increase or decrease in the length of the lever arm.

The attached drawing shows various embodiments of the invention by way of example.

Figure 1:
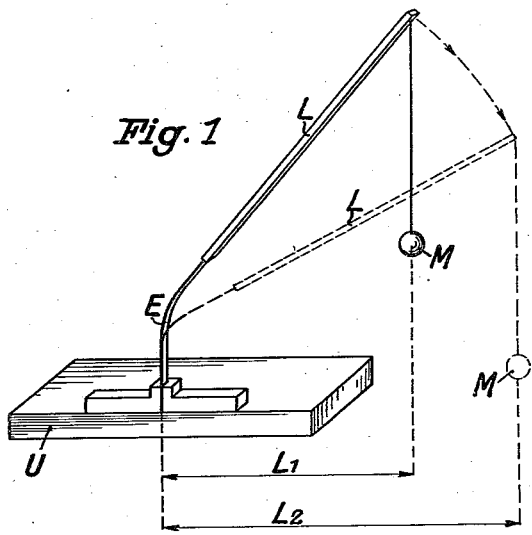
Fig. 1 is a perspective view of a measuring device according to the present invention comprising an inclined lever with a weight suspended therefrom.

Fig. 1 shows the lever L from one end of which is suspended a weight M and the other end of which is connected to a blade spring E secured to the base U. The effective lever arm formed by lever L, in the position shown in full lines, is designated as $L_1$. If the gravitational acceleration is increased the equilibrium of the lever system is upset with the result that the lever L takes up a more inclined position. The lever arm $L_1$ is thereby increased. The increase of the lever arm causes further inclination of the system. The latter will come to rest only when the increased elastic opposing force brought about by the stronger curvature of the blade spring is able to balance the combined action of the gravitational acceleration and the increase of the lever arm to $L_2$. $L_2$ represents the effective lever arm formed by the lever L in the inclined position shown in dotted lines in Fig. 1. The increased value of the gravitational force is thus expressed by the increased length of the lever arm. In other words, measurement of gravity is greatly simplified: A certain length of the lever arm corresponds to a certain value of gravitational force.

Figure 2:
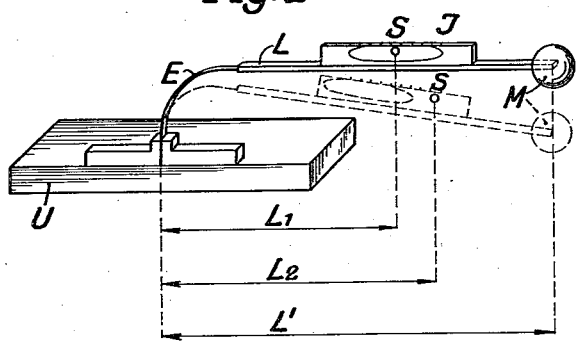
Fig. 2 is a perspective view of a modification of the device according to Fig. 1, and comprises a horizontal lever provided with a spirit level.

In Fig. 2 a substantially horizontal lever L is employed to one end of which is attached a weight M and the other end of which is connected to a blade spring E secured to the base U. A spirit level J is mounted on lever L. The effective length of the lever arm supporting the spirit level J is designated by $L_1$. If the gravitational acceleration is increased the equilibrium of the lever system is upset with the result that lever arm L assumes a more inclined position. Due to this the bubble of the spirit level moves to the left as shown in Fig. 2 and the centre of gravity S of the spirit level moves to the right. The lever arm $L_1$ of the spirit level is thereby increased in length and its value will be $L_2$. The operation is the same as in the other embodiments.

Figure 3:
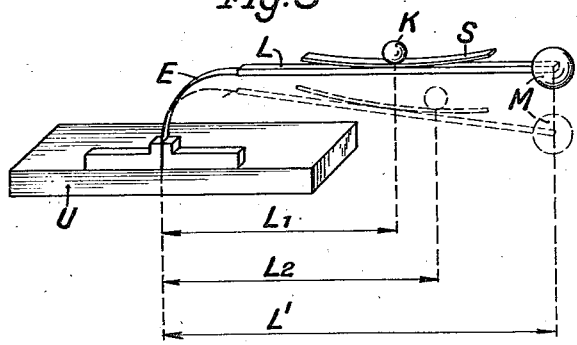
Fig. 3 is a perspective view of a second modification of the present invention comprising a movable ball and guiding means therefor.

In Fig. 3 the spirit level J of Fig. 2 is replaced by a ball K rolling in a cup S. If the lever L is inclined the ball rolls to the right as shown in Fig. 3 and the lever arm $L_1$ of the ball will become $L_2$.

In Figs. 1 to 3 the lever arm is shown in two positions, the first one (in full lines) indicating the starting of the measurement, the second one (in dotted lines) illustrating the transposition to a new station due to an increase in gravitational force.

What I claim and desire to secure by Letters Patent of the United States is:

1. A gravitational meter, comprising a base, a spring knee section rigidly mounted upright in said base and being under tension and curved to one side of the perpendicular and a rigid section forming an extension of the outer end of said knee section, and a mass carried by the rigid section and subject to gravitational pull to cause relative angular displacement of the knee section, whereby the center of gravity of said mass is laterally shifted with respect to the point of attachment of said knee section to the base, the lateral displacements of the said center of gravity indicating different gravitational values.

2. A gravitational meter, comprising a base, a short spring knee section rigidly mounted upright in said base and being under tension and curved to one side of the perpendicular and a rigid section forming an extension of the outer end of said knee section, and a mass hanging perpendicularly from the outer free end of the rigid section and being subject to gravitational pull to cause relative angular displacement of the knee section.

3. A device as claimed in claim 1, in which said rigid section is disposed substantially horizontally, and movable means provided on said rigid section, said means being adapted to move towards and away from the said mass for producing an additional increase or decrease in the displacement of the center of gravity thereof.

4. A gravitational meter comprising: a base, a lever resiliently mounted on said base in a substantially horizontal position, a mass supported by said lever and subject to gravitational pull, whereby said lever is displaced and the center of gravity of said mass is shifted laterally with respect to the point of attachment of said lever to the base, depending upon the gravitational force acting upon said mass, movable means provided on said lever and adapted to move towards and away from said mass for producing an additional increase or decrease in the displacement of the center of gravity thereof during the operation of the device.

5. The device claimed in claim 4, in which said movable means comprises a spirit level secured to the said lever.

6. The device claimed in claim 4, in which said movable means includes a free running ball and guiding means for said ball.

7. The device claimed in claim 4, in which said lever comprises a spring knee section secured at one end to said base and a rigid section secured to the free end of said spring section, and in which said movable means includes a spirit level secured to said rigid section, the center of gravity of said spirit level being adapted to move towards and away from said mass, substantially as described.

8. The device claimed in claim 4, in which said lever comprises a spring knee section secured at one end to said base and a rigid section secured to the free end of said spring section, and in which said movable means includes a ball and guiding means for said ball, the latter being adapted to move freely on said guiding means towards and away from said mass, substantially as described.

STEPHAN BARON VON THYSSEN-BORNEMISZA.